United States Patent
Allen et al.

(10) Patent No.: US 7,272,657 B2
(45) Date of Patent: Sep. 18, 2007

(54) SYSTEM AND METHOD FOR DISPLAYING VIDEO STREAMS RANKED BY USER-SPECIFIED CRITERIA

(75) Inventors: Paul G. Allen, Mercer Island, WA (US); Michael Lee, Cupertino, CA (US); James K. Okamoto, Saratoga, CA (US)

(73) Assignee: Digeo, Inc., Kirkland, WA (US)

( * ) Notice: Subject to any disclaimer, the term of this patent is extended or adjusted under 35 U.S.C. 154(b) by 799 days.

(21) Appl. No.: 09/918,301

(22) Filed: Jul. 30, 2001

(65) Prior Publication Data

US 2003/0023742 A1    Jan. 30, 2003

(51) Int. Cl.
*G06F 15/16* (2006.01)

(52) U.S. Cl. .............. 709/231; 709/230; 709/228; 709/229; 725/54

(58) Field of Classification Search ............... 709/231, 709/230, 213, 228, 229; 725/54, 52
See application file for complete search history.

(56) References Cited

U.S. PATENT DOCUMENTS

| | | | |
|---|---|---|---|
| 4,831,438 A | 5/1989 | Bellman, Jr. et al. | 358/108 |
| 5,546,324 A | 8/1996 | Palmer et al. | 364/514 |
| 5,606,364 A | 2/1997 | Kim | 348/159 |
| 5,877,821 A | 3/1999 | Newlin et al. | 348/724 |
| 5,914,747 A | 6/1999 | Hamilton | 348/15 |
| 6,052,509 A | 4/2000 | Abe | 386/117 |
| 6,128,649 A | 10/2000 | Smith et al. | 709/217 |
| 6,223,213 B1 | 4/2001 | Cleron et al. | 709/206 |
| 6,239,836 B1 | 5/2001 | Suzuki et al. | 348/211 |
| 6,243,129 B1 | 6/2001 | Deierling | 348/15 |
| 6,366,311 B1 | 4/2002 | Monroe | 348/148 |
| 6,539,545 B1 | 3/2003 | Dureau et al. | 725/48 |
| 6,543,052 B1 | 4/2003 | Ogasawara | 725/60 |
| 6,564,380 B1 | 5/2003 | Murphy | 725/86 |
| 2002/0049977 A1* | 4/2002 | Miller et al. | 725/82 |
| 2002/0056123 A1* | 5/2002 | Liwerant et al. | 725/87 |
| 2002/0073423 A1* | 6/2002 | Krakirian | 725/40 |
| 2002/0083462 A1* | 6/2002 | Arnott | 725/100 |

* cited by examiner

*Primary Examiner*—Jason Cardone
*Assistant Examiner*—Adnan M. Mirza
(74) *Attorney, Agent, or Firm*—Kory D. Christensen; Stoel Rives, LLP

(57) ABSTRACT

A plurality of video streams are simultaneously displayed on a terminal coupled to a network. The video streams are ranked according to a set of ranking criteria and displayed in accordance with the ranking. Highly ranked video streams may be displayed in prominent positions or emphasized in order to quickly draw the user's attention to the video streams.

65 Claims, 9 Drawing Sheets

SYSTEM AND METHOD FOR DISPLAYING VIDEO STREAMS RANKED BY USER-SPECIFIED CRITERIA

BACKGROUND OF THE INVENTION

1. Field of the Invention

The present invention relates generally to interactive television systems. More specifically, the present invention relates to systems and methods for displaying video streams ranked by user-specified criteria.

2. Description of Related Background Art

In recent years, a growing number of personal computers and interactive television systems are equipped with digital video cameras. Such cameras may be configured as "web cameras" or "webcams." A webcam captures a stream of video images and broadcasts the images via the Internet to any requesting Web browser (e.g., Microsoft Internet Explorer®).

In the early days of the Internet, webcams were used to monitor coffee pots and fish tanks. Today, thousands of webcams are used in such diverse and important applications as monitoring freeway traffic (e.g., "traffic cams") and monitoring children at day care centers (e.g., "kiddie cams" or "cradle cams").

Because of the many video options available, a user may wish to view the output of many webcams simultaneously. In fact, a user may desire to watch the output of more webcams than can be feasibly displayed at the same time on a computer monitor or television display.

Of course, not every webcam provides the same degree of interest to a user all of the time. For instance, some webcams may only be of interest at certain times of the day, e.g., traffic cams during rush hour. Other webcams may be interesting only when the scene being displayed changes. For example, where a webcam monitors an individual's empty home, a change in scene created by a burglar moving into the webcam's field of view would be of considerable interest.

Unfortunately, if the webcam of interest is not currently being displayed, a user may miss an important event. Even if the webcam is being displayed, a user cannot typically focus on more than a few webcams simultaneously. Thus, the user may still miss an important event simply because he or she is focused on another webcam.

Accordingly, what is needed is a system and method for allowing a user to simultaneously monitor the output of multiple webcams. What is also needed is a system and method of ranking video streams generated by webcams according to user-defined criteria. Indeed, what is needed is a system and method for drawing a user's attention to video streams of the highest potential significance based on the user-defined criteria.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
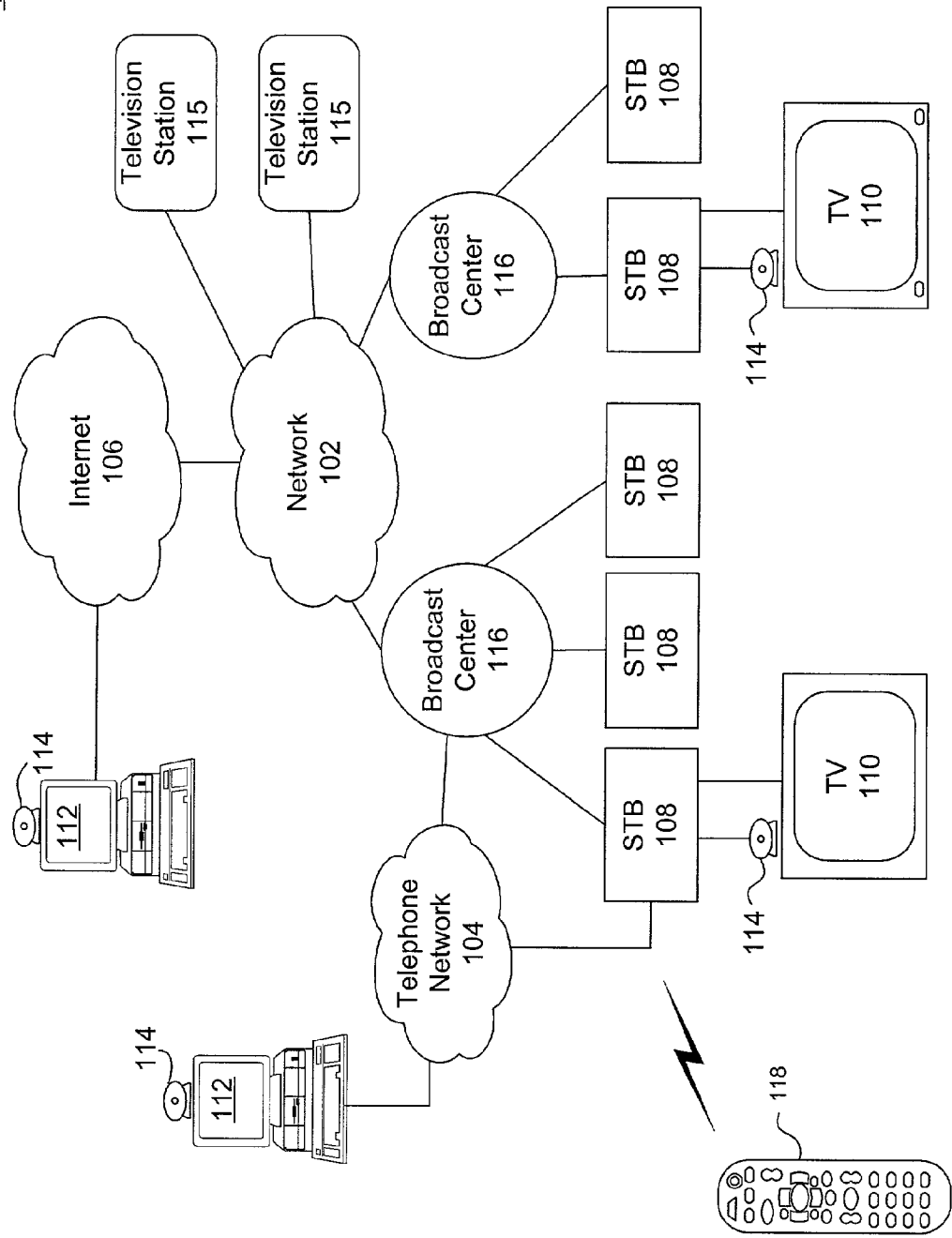
FIG. 1 is a block diagram of a system for transmitting and simultaneously displaying multiple video streams.

The present invention solves the foregoing problems and disadvantages by providing a system and method for video streams ranked according to user-specified criteria. In one embodiment, a terminal in a network receives and simultaneously displays a number of video streams. Each video stream may be generated by a camera associated with a different terminal in the network.

The video streams may be displayed on the terminal in various formats, such as a grid format or a ticker format. For instance, in the grid format, the video streams are arranged in rows and columns. In the ticker format, the video streams move across the terminal in a carousel fashion (e.g., like a stock ticker). Any number of video streams may be displayed in either format, limited only by bandwidth considerations. Accordingly, a user may monitor a number of video streams simultaneously.

The displayed video streams may be ranked according to a set of user-specified ranking criteria. For example, a video stream may also be promoted to a higher rank when a scene change is detected. Alternatively, the video streams may be ranked at periodic intervals according to the recency or frequency of scene updates.

In some cases, video streams may receive a higher rank depending on the date or time. For example, a video stream from a traffic cam may be promoted to a higher rank during rush hour. Likewise, ranking may be based on external events and data. For instance, if a user's calendar has an entry for air travel on a particular day, webcam views for airport traffic and weather may be promoted to a higher rank.

Preferably, the ranked video streams are displayed on the terminal such that the video stream of highest rank is brought to the attention of the user. For example, in a grid layout, the video streams may be displayed in order of rank, with the most highly ranked video stream being shown in the upper left-hand corner of the display screen. Of course, various other arrangements of video streams that indicate a ranking or hierarchy are within the scope of the invention.

In certain embodiments, only video streams having at least a particular rank may be shown on the display screen. This is advantageous where there are too many video streams to feasibly display at the same time. Moreover, a user's attention may be drawn to highly ranked video streams in other ways. For example, a video stream of highest rank may be enlarged relative to the other video streams.

In a "ticker" format, video streams move across the display screen a carousel fashion (e.g., like a stock ticker). In such an embodiment, video streams of a higher rank are displayed closer to the beginning position of the ticker than video streams of a lower rank. Accordingly, a user's attention is quickly drawn to potentially significant video streams without needing to focus every video stream being displayed.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Throughout the following disclosure, the term "coupled" may be used to refer to components that are either directly connected to one another or linked by one or more other components. Thus, as used herein, the term "coupled" may be synonymous with "in electrical communication with" or simply "in communication with."

Referring now to FIG. 1, there is shown system 100 for transmitting and displaying video streams using a communication network 102. The network 102 may be embodied, for example, a broadband cable network or a direct satellite broadcast (DBS) network. The network may also communicate with or be embodied as other networks, such as a telephone network 104, or a packet-driven network (e.g., the Internet 106).

In one configuration, the system 100 includes a plurality of set top boxes (STBs) 108 located, for instance, at customer homes. Generally, an STB 108 is a consumer electronics device that serves as a gateway between a customer's television 110 and the network 102. In alternative embodiments, an STB 108 may be embodied more generally as a personal computer 112, an advanced television 110 with integrated STB functionality, or another type of client terminal.

An STB 108 receives encoded video streams and other information from the network 102 and decodes the same for display on the television 110 or other display device (such as a computer monitor, flat panel display, or the like). As its name implies, an STB 108 is typically located on top of, or in close proximity to, a television 110.

An STB 108 may be coupled to a video camera 114, which captures video streams for the STB 108. The video camera 114 may be embodied as a digital video camera having a charge-coupled device (CCD) array. Digital video cameras are well known in the art, such as the Logitech QuickCam Pro USB®, available from Logitech, Inc. of Fremont, Calif.

The video camera 114 may be configured as a "webcam", which captures a continual stream of video images and broadcasts the images via a communication network, such as the Internet 106, to a requesting client module, such as a Web browser. However, the term "webcam" should not be construed as being limited only to the World Wide Web component of the Internet.

In certain embodiments, the video camera 114 may include an integrated microphone (not shown) for capturing audio signals. Alternatively, the microphone may be integrated with the STB 108, the remote control 118, the television 110, or the like.

The following discussion refers primarily to the capture and transmission of video streams. However, those skilled in the art recognize that the term "video streams" also include or are associated with audio signals. Thus, where video 110 streams and video components are specifically illustrated, audio signals and audio components are implied.

As discussed in further detail below, the STB 108 may convert video streams generated by the video camera 114 into various formats for transmission through the network 102. The STB 108 may transmit video streams to one or more other STBs 108, to a personal computer 112, or to another type of terminal.

It should be noted, however, that video streams are not limited to live video generated by webcams. For example, in one embodiment, video streams may also include broadcast television programming generated by content providers, such as television stations 115.

In one embodiment, each STB 108 is coupled to the network 102 via a broadcast center 116. In the context of a cable network, the broadcast center may take the form of a head-end, which is generally a centrally-located facility where television programs are received from a local cable TV satellite downlink or other source and packaged together for transmission to customer homes. In one configuration, a head-end also functions as a Central Office (CO) in the telephone industry, routing video streams and other data to and from the various STBs 108 serviced thereby.

The broadcast center 116 may also embodied as a satellite broadcast center within a direct satellite broadcast (DBS) system. A DBS system may utilize a small 18-inch satellite dish (which is an antenna for receiving a satellite broadcast signal). Each STB 108 may be integrated with a digital integrated receiver/decoder (IRD), which separates each channel, and decompresses and translates the digital signal from the satellite dish so that the television 110 can show it. The remote control 118 may then be used to control the IRD with the integrated STB 108, and optionally the television 110.

Programming for a DBS system may be distributed, for example, by multiple high-power satellites in geosynchronous orbit, each with multiple transponders. Compression (e.g., MPEG) is used to increase the amount of programming that can be transmitted in the available bandwidth.

The broadcast centers 116 may be used to gather programming content, ensure its digital quality, and transmit the signal up to the satellites. Programming may come to the broadcast centers 116 from content providers (CNN, ESPN, HBO, TBS, etc.) via satellite, fiber optic cable and/or special digital tape. Satellite-delivered programming is typically immediately digitized, encrypted and uplinked to the orbiting satellites. The satellites retransmit the signal back down to every earth-station, e.g., every compatible DBS system receiver dish at customers' homes and businesses.

Some programs may be recorded on digital videotape in the broadcast center 116 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 102, broadcast centers 116 may be coupled directly to one another or through the network 102. In some cases, broadcast centers 116 may be connected via a separate network, one particular example of which is the Internet 106. Two or more STBs 108 may also be served by the same broadcast center 116.

Transmission between broadcast centers 116 may occur, for example, (i) via a direct peer-to-peer connection between broadcast centers 116, (ii) upstream from a first broadcast center 116 to a network 102 and then downstream to a second broadcast center 116, (iii) via the Internet 106, or (iv) via a telephone network 104. For example, a first STB 108 may send a video transmission upstream to a first broadcast center 116, then to a second broadcast center 116, and finally downstream to a second STB 108.

In one configuration, video streams are distributed in an encoded format, such as MPEG (Moving Picture Experts Group). Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG. Of course, proprietary video encoding formats may be used within the scope of the invention.

Each STB 108 may be distinguished from other network components by a unique identifier, number, code, or address, examples of which include an IP (Internet Protocol) address or a MAC (Media Access Control) address. Thus, video streams and other information may be transmitted from the network 102 to a specific STB 108 by specifying the corresponding address, after which the network 102 routes the transmission to its destination using conventional techniques.

The network 102 is also preferably coupled to the Internet 106 to provide access thereto by the STBs 108. The Internet 106 is a "network of networks" and is well known to those skilled in the art. Communication over the Internet 106 is accomplished using standard protocols, such as TCP/IP (transmission control protocol/Internet protocol) and the like.

A remote control 118 is provided, in one configuration, for convenient remote operation of the STB 108 and/or the television 110. The remote control 118 may use infrared (IR), radio frequency (RF), or other wireless technologies to transmit control signals to the STB 108 and the television 110. Other remote control devices are also contemplated, such as a wired or wireless mouse (not shown), a keyboard (not shown), or the like.

Figure 2:
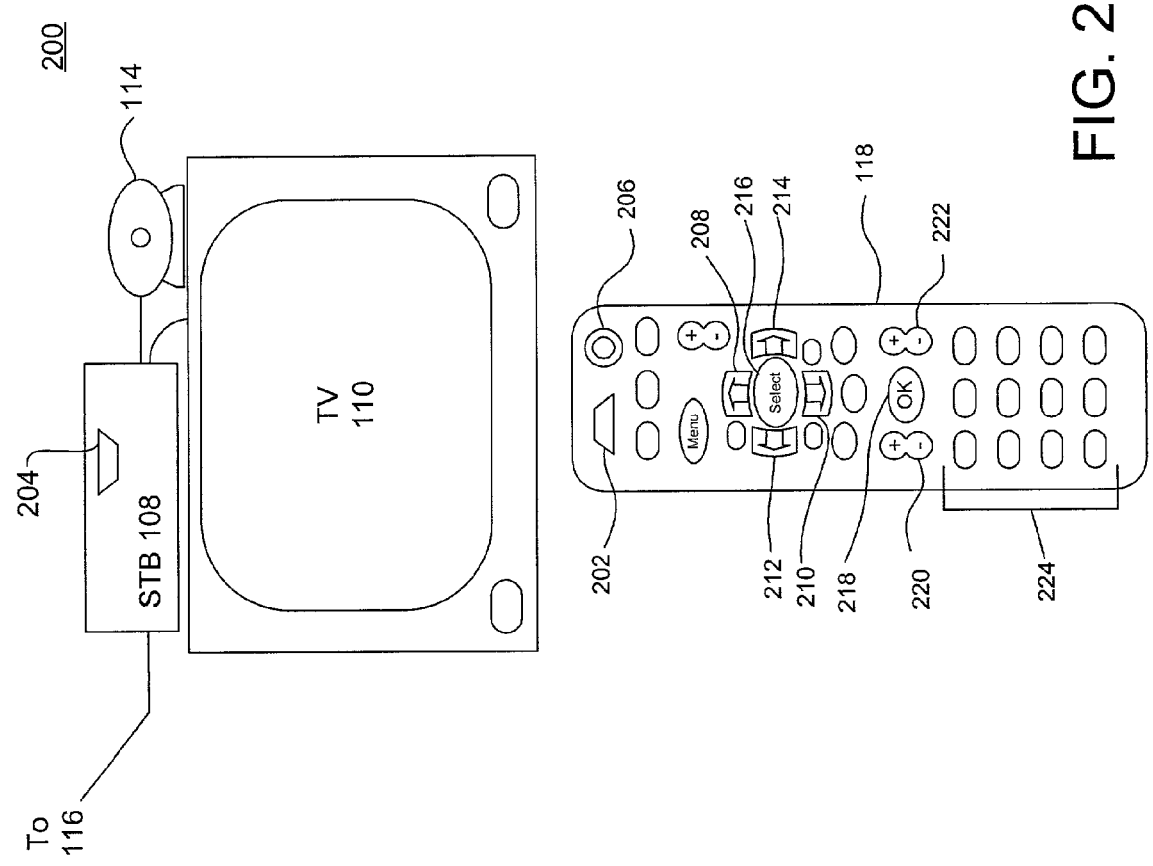
FIG. 2 is an illustration of an interactive television system including a remote control, a camera, a set top box, and a television.

FIG. 2 is an illustration of an interactive television system 200, including a remote control 118, a camera 114, a set top box 108, and a television 110 (or other display device). As noted, the remote control 118 is provided for convenient remote operation of the STB 108 and television 110. Preferably, control signals are transmitted from a wireless transmitter 202 in the remote control 118 to a wireless receiver 204 in the STB 108 and/or the television 110.

In the depicted embodiment, the remote control 118 includes a plurality of buttons or similar controls. For instance, the remote control 118 may include a power button 206, an up arrow button 208, a down arrow button 210, a left arrow button 212, a right arrow button 214, a "Select" button 216, an "OK" button 218, channel adjustment buttons 220, volume adjustment buttons 222, alphanumeric buttons 224, and the like. The functions of certain of the above-identified buttons will be discussed in greater detail below.

Figure 3:
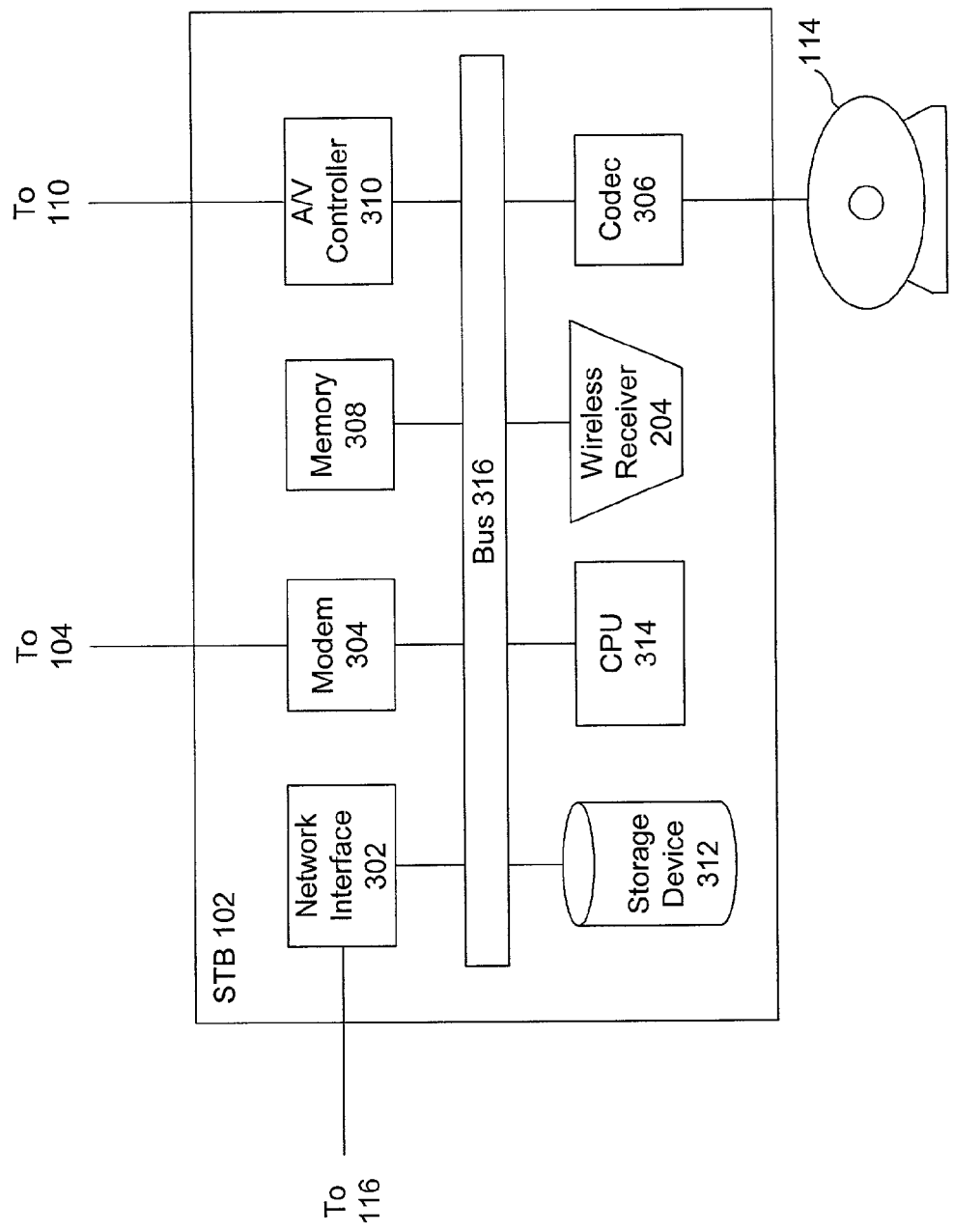
FIG. 3 is a block diagram of physical components of a set top box.

FIG. 3 is a block diagram of physical components of a set top box 108 according to an embodiment of the invention. The STB 108 may include, in one configuration, a network interface 302 for communicating with the network 102 via the broadcast center 116. The interface 302 may include conventional tuning circuitry for receiving MPEG (Moving Picture Experts Group) packets for a selected television channel. The interface 302 may also include conventional cable modem circuitry for sending or receiving other types of data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in an upstream transmission.

Of course, upstream transmission may be accomplished differently for different networks. Alternative ways to accomplish upstream transmission include using back channel transmission, which is typically sent via an analog telephone line, ISDN, DSL, or other techniques. For example, in one embodiment, communication with a telephone network 104 may also be accomplished via a separate telephone modem 304, such as a DSL (digital subscriber line) or analog telephone modem.

The STB 108 also preferably includes a codec (encoder/decoder) 306. The codec 306 serves to encode audio/video signals into a network-compatible data stream for transmission over the network 102. The codec 306 also serves to decode a network-compatible data stream received from the network 102. As depicted, the codec 306 may be implemented as a hardware component. Alternatively, or in addition, software encoding and decoding may be used. The codec 306 may use various algorithms, such as MPEG, for encoding and decoding. The codec 306 may be directly or indirectly coupled to the video camera 114 in order to encode a captured video signal.

The STB 108 may further include a memory device 308, such as a random access memory (RAM), to store data for temporary use. Similarly, a read-only memory (ROM) may be provided for storing more permanent data, such as fixed code and configuration information.

In one implementation, an audio/video (A/V) controller 310 is provided for converting decoded digital audio/video information into analog or digital signals for display/playback on the television 110 or other display devices. The A/V controller 310 may be implemented using one or more physical devices, such as separate graphics and audio interfaces. Preferably, the A/V controller 310 includes graphics hardware for performing bit-block transfers (bit-blits) and other graphical operations.

The STB 108 may also include a storage device 312, such as a hard disk drive, or the like. The storage device 312 may record encoded television broadcasts and retrieve the broadcasts at a later time for decoding by the codec 306 and display by the A/V controller 310. Thus, the storage device 312 may be used in PVR (personal video recording) applications, such as time shifting, pausing (buffering) live video, etc.

The storage device 312 may also be used, in various embodiments, to store viewer preferences, parental lock settings, electronic programming guide (EPG) data, programming preferences, passwords, e-mail messages, and the like. In one implementation, the storage device 312 also stores an operating system (OS) for the STB 108, such as Windows CE® or Linux®.

As previously noted, the STB 108 may include a wireless receiver 204 for receiving control signals from the wireless transmitter 202 of the remote control 118. The wireless transmitter 202 may rely on various wireless technologies, such as IR or RF.

A CPU 314 controls the operation of the STB 108, including the other components thereof, which are coupled to the CPU 314 via a bus 316. The bus 316 serves as a communication channel between many components (e.g., CPU 314, Interface 302, storage device 312) of the STB 108. The CPU 314 may be embodied as a microprocessor, a microcontroller, a digital signal processor (DSP) or other device known in the art. For example, the CPU 314 may be embodied as an Intel® x86 microprocessor. The CPU 314 may perform various logical and arithmetic operations in response to control signals generated by the remote control 118.

Of course, FIG. 3 illustrates only one possible configuration of an STB 108. Those skilled in the art will recognize that various other architectures and components may be provided within the scope of the invention. In addition, various standard components of a typical STB 108 are not illustrated in order to avoid obscuring aspects of the invention.

Figure 4:
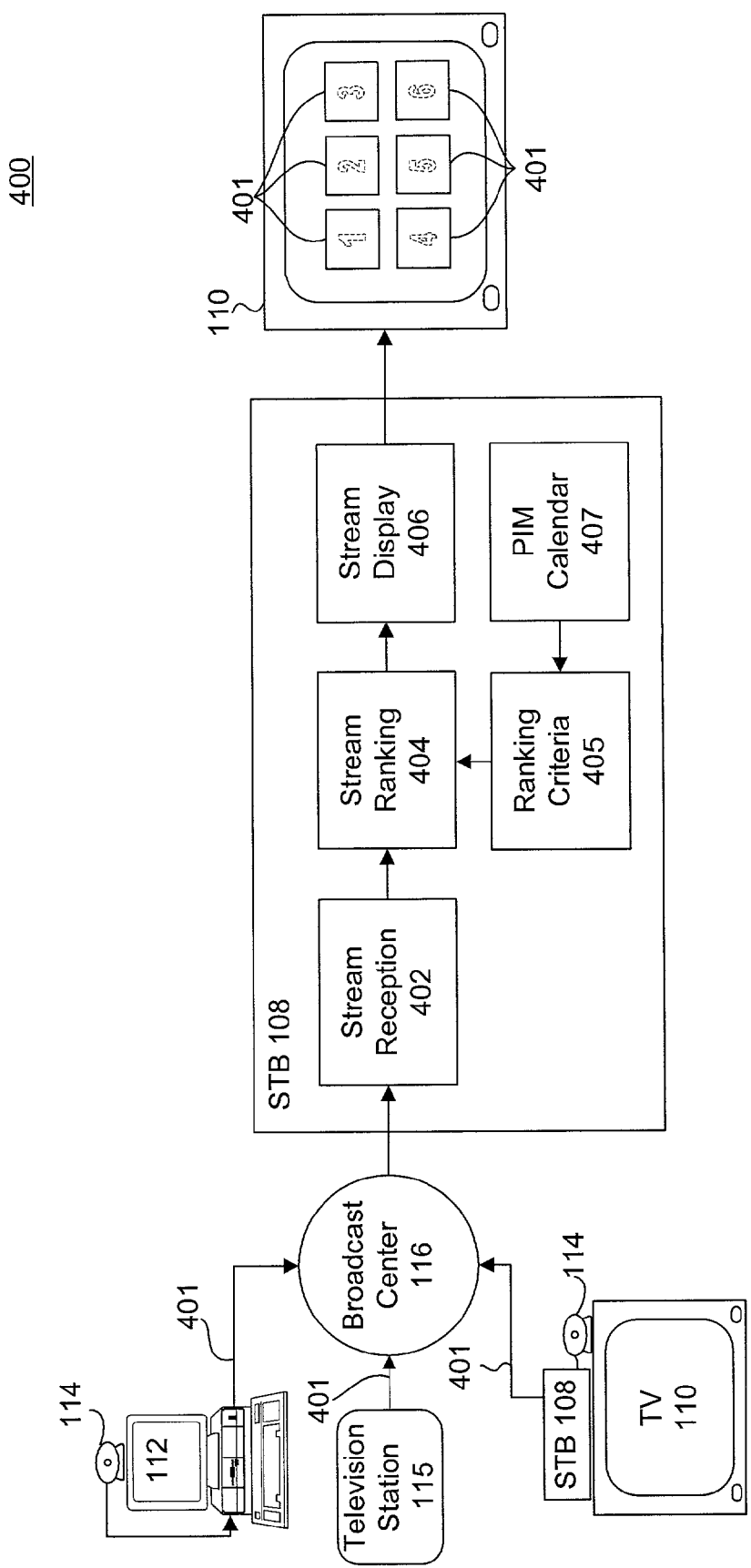
FIG. 4 is a block diagram of logical components of a system for displaying video streams ranked according to user-specified criteria.

FIG. 4 is a block diagram of logical components of system 400 for displaying a plurality of video streams 401 ranked according to user-defined criteria. The depicted logical components may be implemented using one or more of the physical components shown in FIG. 3. Additionally, or in the alternative, various logical components may be implemented as software modules stored in the memory 308 and/or storage device 312 and executed by the CPU 314. Those skilled in the art will recognize that various illustrated components may be combined together or integrated with standard components in various configurations without departing from the scope or spirit of the invention.

As shown in FIG. 4, a plurality of video streams 401 are generated by video cameras 114 coupled to terminals within a network 102. The terminals may be embodied as STBs 108, personal computers 112, or the like. Also, in one embodiment, a video stream 401 may be a broadcast television program generated by a television station 115. The video streams 401 may be conveyed to an STB 108 via one or more broadcast centers 116.

In one embodiment, the STB 108 includes a stream reception component 402, which receives the video streams 401. As noted above, the video cameras 114 may be configured as webcams, which comprise hardware and/or software for providing video streams 401 to a requesting client module, such as a Web browser. In such an embodiment, the stream reception component 402 may be embodied as the component of a Web browser that is responsible for receiving and processing video streams 401 received from webcams. However, the stream reception component 402 need not be implemented in the context of a Web browser.

The particular video streams 401 received by the stream reception module 402 are preferably user-selected. For example, the user may specify a network address of each camera-equipped terminal for which a video stream 401 is desired. The stream reception component 402 then interacts with the selected terminal to receive the video stream 401 using standard protocols well known to those skilled in the art.

In one implementation, the STB 108 also includes a stream ranking component 404. The stream ranking component 404 ranks the video streams 401, or at least a portion thereof, according to user-specified ranking criteria 405. As explained in greater detail below, the rankings determine how (and possibly whether) particular video streams 401 are displayed on the television 110 or other display device. For instance, video streams 401 may be displayed on the television 110 in order of rank, allowing a user to easily focus on the webcams of greatest significance.

In one embodiment, the video streams 401 are ranked according to recency of scene changes. For instance, a video stream 401 may be promoted to a higher rank when a scene change is detected. This is advantageous when a user wishes to know when someone or something enters the field of view of a webcam, such as a burglar, etc.

Scene changes may be detected in numerous ways. For example, an MPEG-2 encoded video stream 401 does not generally transmit complete video frames. Rather, key video frames are periodically sent followed by a series of changes or updates. These changes or updates may be detected and quantified using techniques known in the art. Thus, where a webcam is monitoring an empty room, a person entering the field of view of the camera would create a detectable change in the video stream 401 produced by that webcam. Naturally, other video formats and transmission protocols may lend themselves to a similar ranking technique.

In one implementation, each of the video streams 401 may be ranked according to the recency of the last significant scene change. Alternatively, the video streams 401 may be ranked according to the frequency of scene changes. In still other embodiments, a single video stream 401 is promoted to the highest rank in response to a scene change being detected.

In alternative embodiments, different ranking criteria 405 may be used. For example, a video streams 401 may be assigned a higher rank (and thus be displayed or displayed more prominently) depending on the particular time of day and/or day of the week. For example, a video stream 401 generated by a webcam monitoring freeway traffic may be promoted to a higher rank during rush hour.

In yet another alternative, video streams 401 may be ranked according to external events and/or data. For instance, a calendar 407 from a user's personal information manager (PIM), such as Microsoft Outlook®, may include an entry for air travel on a particular day. In one embodiment, video streams 401 related to airport traffic in the departure city and weather in both the departure and arrival cities may be given a higher priority on the day of travel. Of course, a variety of other ranking criteria 405 based on external events and data are possible.

In addition, a user may specify the ranking of a video stream 401. For example, a user may specify that a video stream 401 from a webcam depicting his home has the highest rank, particularly during the hours at which his or her children are at home. User specification of ranking may be implemented through menus or other standard user interface mechanisms.

As noted before, the video streams 401 may also include broadcast television programming. In certain embodiments, video streams 401 may be ranked according to popularity, e.g., by how many STBs 108 are receiving a particular video stream. Viewing statistics could be maintained by the television stations 115, television networks, or a centralized server (not shown).

In one embodiment, ranking occurs continuously or on the occurrence of a particular event, e.g., with the detection of a scene change in a video stream 401. In alternative embodiments, ranking occurs at periodic intervals, e.g., every 2 minutes. Any of the above-described ranking criteria 405 may be combined in a suitable manner. For example, a secondary ranking criterion 405 may be designated to break ties resulting from the application of a primary ranking criterion 405.

The stream ranking component 404 may be implemented as a software module stored in the memory 308 and/or storage device 312 and executed by the CPU 314. For example, the ranking component 404 may be embodied within a "plug-in" application for a Web browser.

In one embodiment, the STB 108 also includes a stream display component 406, which simultaneously displays the video streams 401 (or a subset thereof) on a display device, such as a television 110. The stream display component 406 may be implemented, in certain embodiments, as the component of a Web browser responsible for displaying video streams 401 received from multiple webcams.

As explained in greater detail below, the stream display component 406 may arrange the ranked video streams 401 in different formats. Typically, the video streams 401 will be arranged in order of rank. For instance, FIG. 4 depicts one exemplary embodiment in which a plurality of video streams 401 are arranged in order of rank within a grid format. Alternatively, one or more highly ranked video streams 401 may be emphasized, as described in greater detail below.

Figure 5:
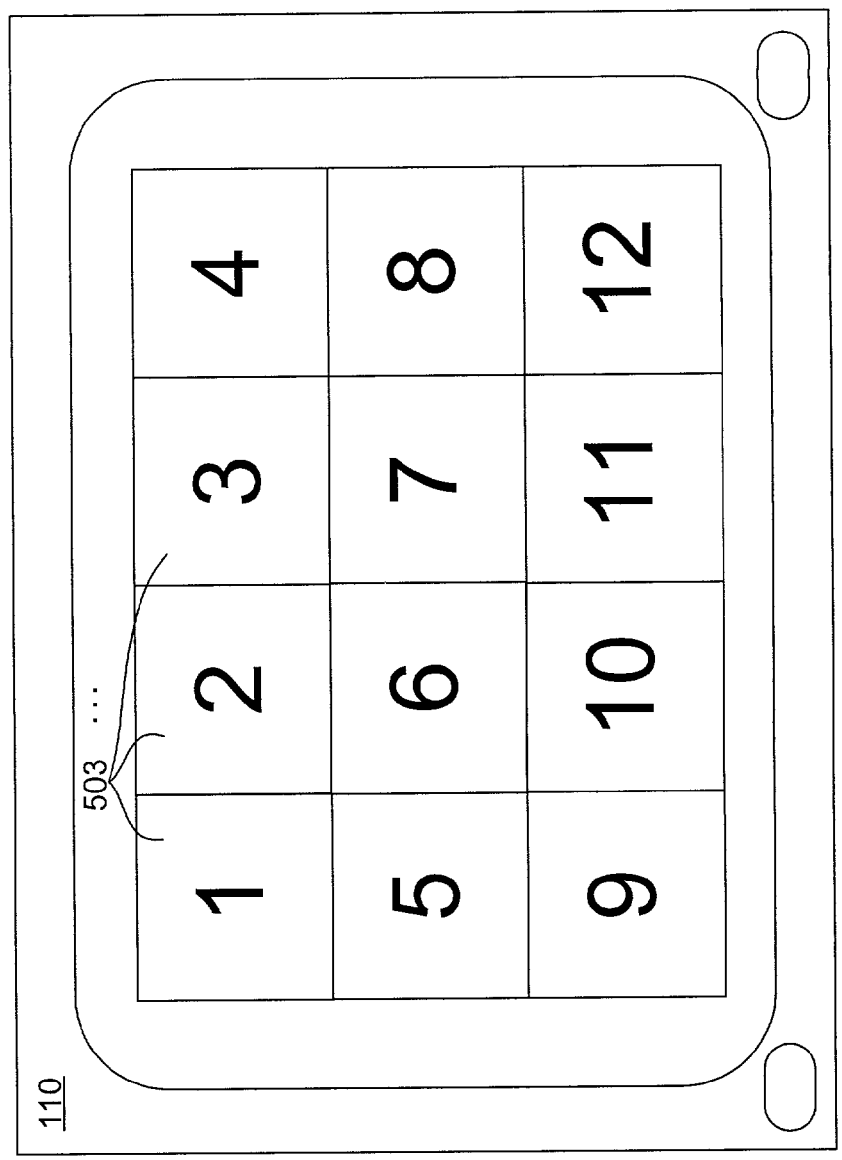
FIG. 5 illustrates one possible layout for ranked video streams on a display device.
Figure 6:
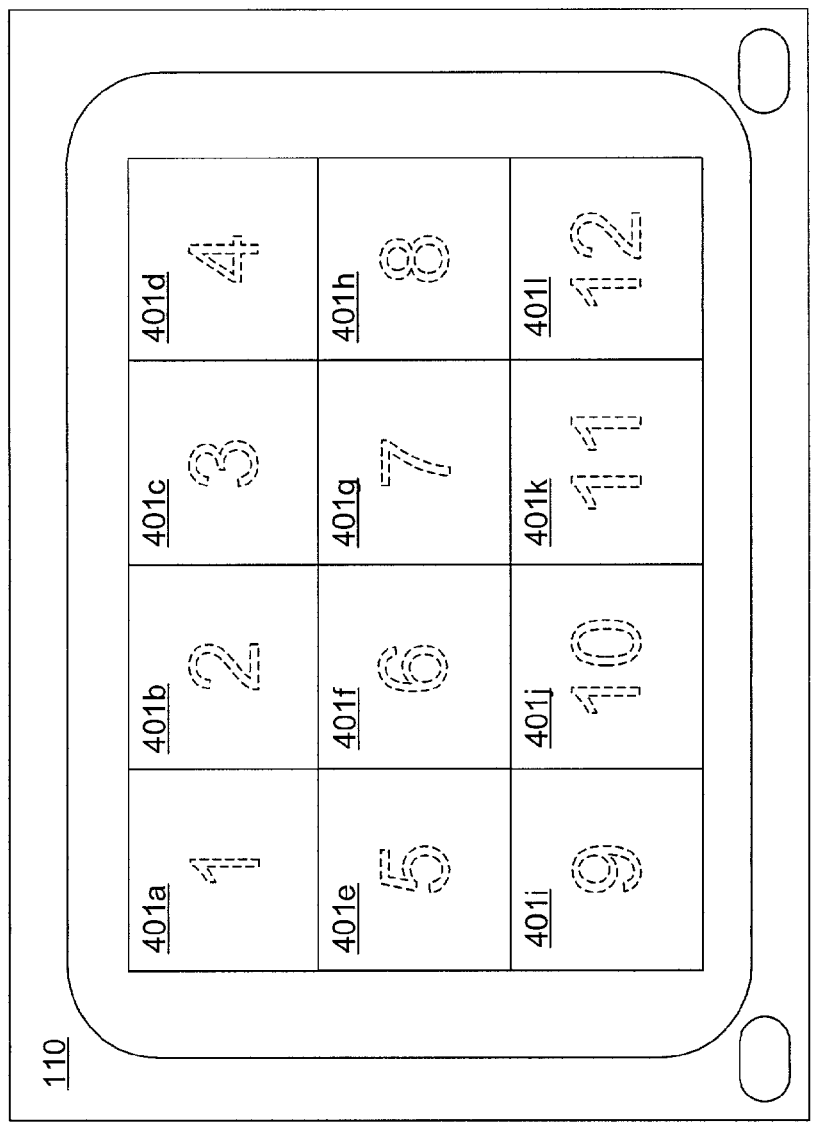
FIG. 6 illustrates a plurality of ranked video streams being displayed in a grid format.

FIGS. 5 and 6 illustrates one possible arrangement of video streams 401 on a television 110 to indicate a rank or priority. For example, as depicted in FIG. 5, the display area of the television 110 may be divided into a number of positions 503 at which video streams 401 may be displayed. The number within each position 503 indicates a rank or priority for that position 503. Of course, the numbers are provided for convenience of description only and would not normally be displayed on the television 110.

In the depicted embodiment, video streams 401 displayed at positions 503 near the top of the television 110 have a higher rank than video streams 401 displayed at positions 503 near the bottom of the television 110. Likewise, video streams 401 displayed at positions 503 near the left-hand side of the television 110 have a higher rank than video streams 401 displayed at positions 503 near the right-hand side of the television 110. Those skilled in the art will recognize that FIG. 5 illustrates one of many possible arrangements of video streams 401, and many variations thereof may be included within the scope of the invention.

FIG. 6 illustrates a plurality of video streams 401a-401l being displayed at the positions 503 illustrated in FIG. 5. In one implementation, only video streams 401 of a threshold rank or higher (e.g., the nine most significant video streams 401) may be shown on the display screen. This may occur, for example, when there are too many video streams 401 to be simultaneously displayed.

Figure 7:
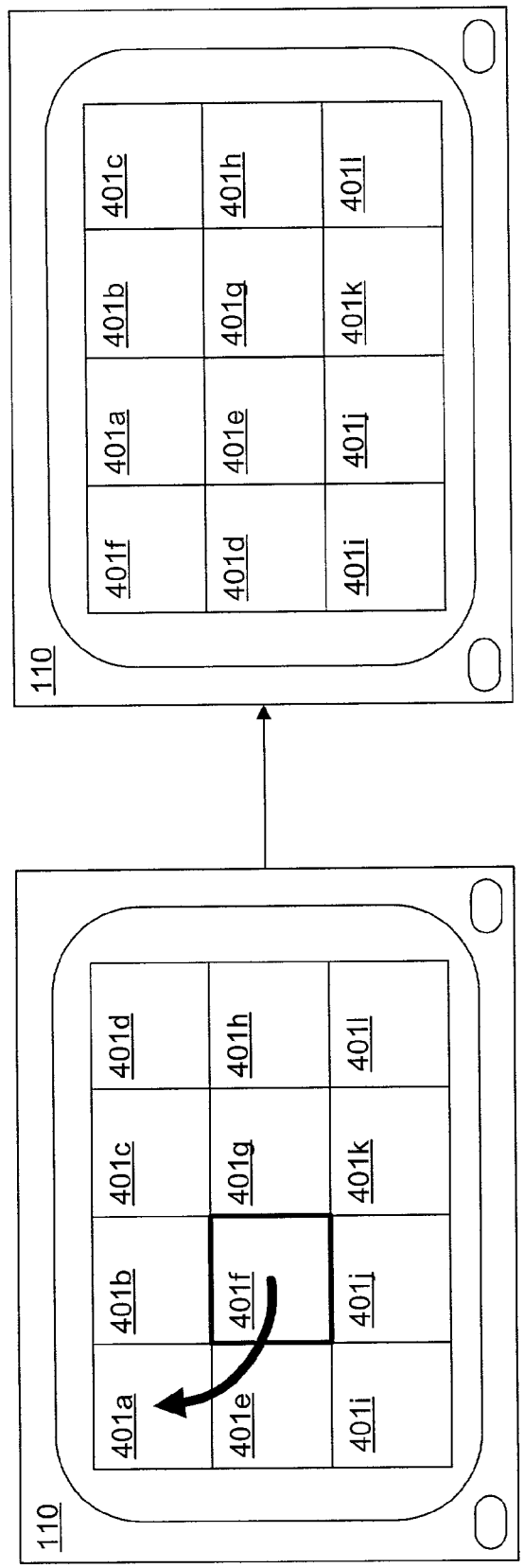
FIG. 7 illustrates the promotion of a video stream to a higher rank.

FIG. 7. illustrates the promotion of a video stream 401f to a higher rank, e.g., when a scene change is detected, when rush hour begins, etc. In one implementation, other video streams 401a-401e may be demoted to accommodate the new rank of the video stream 401f. In another embodiment, the promoted video stream 401f merely switches places with the video stream 401a it is replacing. Of course, in other embodiments, all of the video streams 401a-401l may be re-ranked, resulting in more than a single change.

Figure 8:
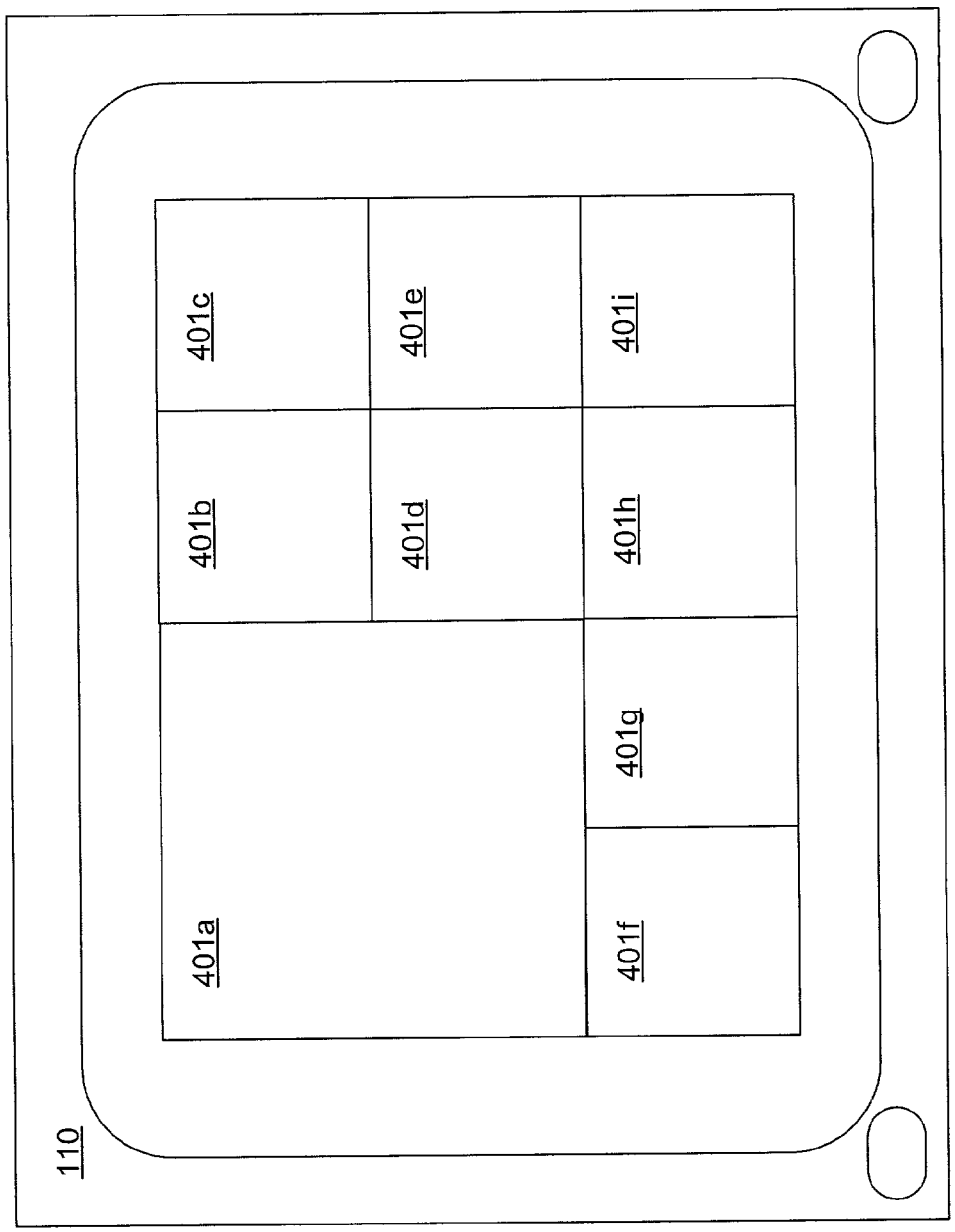
FIG. 8 illustrates one video stream being enlarged relative to other video streams.

As shown in FIG. 8, a video stream of highest rank 401a may be enlarged or otherwise highlighted to attract the attention of the user. In this embodiment, the remaining video streams 401b-401i are not necessarily displayed according to rank, although such could be the case. In alternative embodiments, a plurality of video streams (e.g., video streams 401a-401c) are ranked and placed in the appropriate positions 503 (or enlarged), the remaining video streams 401 being arbitrarily placed in the remaining positions 503.

Other methods of emphasizing the video stream(s) 401 of highest rank are contemplated. For example, a graphical indicator, such as an icon, border, etc., may be displayed near or around one or more highly-ranked video streams 401.

Figure 9:
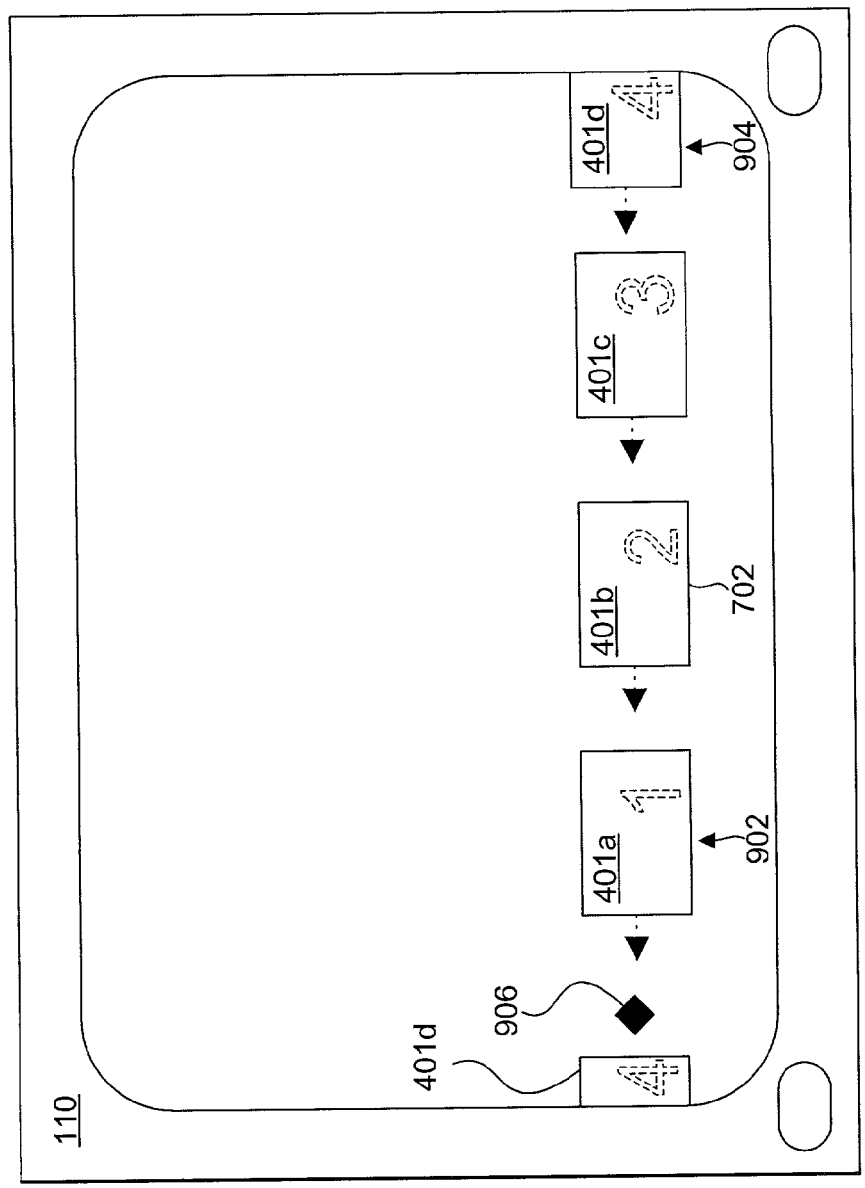
FIG. 9 shows a plurality of ranked video streams being displayed in a ticker format.

FIG. 9 illustrates an alternative arrangement of a plurality of video streams 401a-401d in a ticker format. In one configuration, the displayed video streams 401a-401d move across the television 110 from right to left in a carousel fashion. For example, when the video stream 401d passes beyond the left-hand side of the television 110, it reappears on the right-hand side.

Of course, the ticker format may be configured in various different ways without departing from the spirit and scope of the invention. For example, the video streams 401 may move in any direction. Moreover, more than one row or column of video streams 401 may move across the screen simultaneously.

The ticker may have a beginning and ending position 902, 904. In the embodiment shown, an icon 906 is placed near the beginning position 902 of the ticker so that a user may easily identify the same. In one embodiment, the order of the video streams 401a-401d within the ticker indicates the ranking. For instance, the first video stream 401a displayed after the icon 906 may have the highest rank. Video streams of a lower rank 401b-401d are displayed sequentially thereafter. Thus, promoting a video stream 401 within a ticker may mean moving the video stream nearer the beginning position 902.

Based on the foregoing, the present invention offers numerous advantages over conventional systems. In particular, a user may simultaneously monitor video streams 401 from multiple cameras 114 at a single location. The video streams 401 may be ranked and displayed in order of rank. Highly ranked video streams 401 may be displayed in prominent positions or emphasized (e.g., enlarged). Thus, a user's attention is quickly drawn to video streams 401 depicting potentially significant events without having to focus on more than a few video streams 401.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for organizing video windows on a display screen comprising:
   receiving a plurality of video streams at a network terminal;
   simultaneously displaying the video streams in a plurality of respective video windows within a user interface provided by the network terminal, the user interface being presented upon the display screen;
   ranking within the network terminal at least a portion of the video streams according to a set of ranking criteria, wherein said ranking is to determine the relative locations within the user interface of the respective video windows; and arranging the locations of at least a portion of the plurality of video windows within the user interface in order of the ranking of the respective video streams as determined by the ranking criteria.

2. The method of claim 1, further comprising:
detecting a scene change within a first video stream; and
promoting the first video stream to a higher rank thereby changing the location of the video window used to display the first video stream within the user interface.

3. The method of claim 1, wherein at least one video stream comprises a scene change, and wherein at least a portion of the video streams are ranked, and the associated video windows are arranged within the user interface, according to recency of scene changes.

4. The method of claim 1, wherein at least one video stream comprises a scene change, and wherein at least a portion of the video streams are ranked, and the associated video windows are arranged within the user interface, according to frequency of scene changes.

5. The method of claim 1, wherein the video streams are ranked, and the associated video windows are arranged within the user interface, according to how many network terminals are displaying the respective video streams.

6. The method of claim 1, wherein at least one video stream is promoted to a higher rank in response to the time of day thereby changing the location of the at least one respective video window within the user interface.

7. The method of claim 1, wherein at least one video stream is promoted to a higher rank in response to the day of the week thereby changing the location of the at least one respective video window within the user interface.

8. The method of claim 1, wherein at least one video stream is promoted to a higher rank in response to information contained within a user's calendar thereby changing the location of the at least one respective video window within the user interface.

9. The method of claim 1, wherein displaying comprises:
displaying at least a portion of the video windows in a grid format in the user interface.

10. The method of claim 9, wherein a video window displayed near the top of the user interface is designated as being associated with a video stream having a higher rank than a video window displayed near the bottom of the user interface.

11. The method of claim 9, wherein a video stream displayed near the left side of the user interface is designated as being associated with a video stream having a higher rank than a video window displayed near the right side of the user interface.

12. The method of claim 1, wherein displaying comprises:
displaying at least a portion of the video windows in a scrolling ticker format in the user interface.

13. The method of claim 12, wherein the ticker format comprises a moving carousel of simultaneously-displayed video windows having a beginning position and an ending position, and wherein a video window displayed near the beginning position is associated with a video stream having a higher rank than a video window displayed near the ending position.

14. The method of claim 1, wherein displaying comprises:
visually emphasizing the video window associated with the video stream of highest rank within the user interface.

15. The method of claim 14, wherein emphasizing comprises:
enlarging the video window associated with the video stream of highest rank as displayed within the user interface relative to the other video windows.

16. The method of claim 1, wherein the network terminal comprises one of a cable network terminal and a direct satellite broadcast (DBS) network terminal.

17. The method of claim 1, wherein the network terminal comprises an interactive television system.

18. The method of claim 1, wherein at least one video stream comprises a broadcast television program.

19. The method of claim 1, wherein at least one video stream comprises live video generated by a webcam.

20. A system for organizing video streams on a display screen comprising:
a stream reception component configured to receive a plurality of video streams at a network terminal;
a stream display component configured to simultaneously display the video streams in a plurality of respective video widows within a user interface provided by the network terminal, the user interface being presented upon the display screen; and
a stream ranking component within the network terminal to rank at least a portion of the video streams according to a set of ranking criteria, and wherein the stream display component is further configured to arrange the locations of at least a portion of the plurality of video windows within the user interface in order of the ranking of the respective video streams as determined by the ranking criteria.

21. The system of claim 20, wherein the stream ranking component is configured to detect a scene change within a first video stream and to promote the first video stream to a higher rank thereby changing the location of the video window used to display the first video stream within the user interface.

22. The system of claim 20, wherein at least one video stream comprises a scene change, and wherein the stream ranking component is configured to rank at least a portion of the video streams according to recency of scene changes, and wherein the stream display component is configured to arrange the respective video windows within the user interface according to rank.

23. The system of claim 20, wherein at least one video stream comprises a scene change, and wherein the stream ranking component is configured to rank at least a portion of the video streams according to frequency of scene changes, and wherein the stream display component is configured to arrange the respective video windows within the user interface according to rank.

24. The system of claim 20, wherein the stream ranking component is configured to rank the video streams according to how many network terminals are displaying the respective video streams, and wherein the stream display component is configured to arrange the respective video windows within the user interface according to rank.

25. The system of claim 20, wherein the stream ranking component is configured to promote at least one video stream to a higher rank in response to the time of day thereby changing the location of the respective video window within the user interface.

26. The system of claim 20, wherein the stream ranking component is configured to promote at least one video stream to a higher rank in response to the day of the week thereby changing the location of the at least one respective video window within the user interface.

27. The system of claim 20, wherein the stream ranking component is configured to promote at least one video stream to a higher rank in response to information contained within a user's calendar thereby changing the location of the at least one respective video window within the user interface.

28. The system of claim 20, wherein the stream display component is configured to display at least a portion of the video windows in a grid format within the user interface.

29. The system of claim 28, wherein a video window displayed near the top of the user interface is designated as being associated with a video stream having a higher rank than a video window displayed near the bottom of the user interface.

30. The system of claim 28, wherein a video window displayed near the left side of the user interface is designated as being associated with a video stream having a higher rank than a video window displayed near the right side of the user interface.

31. The system of claim 20, wherein the stream display component is configured to arrange at least a portion of the video windows in a scrolling ticker format within the user interface.

32. The system of claim 31, wherein the ticker format comprises a moving carousel of simultaneously-displayed video windows having a beginning position and an ending position, and wherein a video window displayed near the beginning position is associated with a video stream having a higher rank than a video window displayed near the ending position.

33. The system of claim 20, wherein the stream display component is configured to visually emphasize a video window associated with the video stream of highest rank within the user interface.

34. The system of claim 33, wherein the stream display component is configured to enlarge the video window associated with the video stream of highest rank as displayed on the user interface relative to the other video windows.

35. The system of claim 20, wherein the network terminal comprises one of a cable network terminal and a direct satellite broadcast (DBS) network terminal.

36. The system of claim 20, wherein the network terminal comprises an interactive television system.

37. The system of claim 20, wherein at least one video stream comprises a broadcast television program.

38. The system of claim 20, wherein at least one video stream comprises live video generated by a webcam.

39. A computer program product comprising a machine-readable storage medium storing program code for causing a machine to perform a method for organizing video streams on a display screen, the method comprising: receiving a plurality of video streams on a display screen, the method comprising: receiving a plurality of video streams on a display screen, the method comprising: receiving a plurality of video streams at a network terminal; simultaneously displaying the video streams in a plurality of respective video windows within a user interface provided by the network terminal, the user interface being presented upon the display screen; ranking within the network terminal at least a portion of the video streams according to a set of ranking criteria, wherein said ranking is to determine the relative locations within the user interface of the respective video windows; and arranging the locations of at least a portion of the plurality of video windows within the user interface in order of the ranking of the respective video streams as determined by the ranking criteria.

40. The computer program product of claim 39, further comprising:
    detecting a scene change within a first video stream; and
    promoting the first video stream to a higher rank thereby changing the location of the video window used to display the first video stream within the user interface.

41. The computer program product of claim 39, wherein at least one video stream comprises a scene change, and wherein at least a portion of the video streams are ranked, and the associated video windows are arranged within the user interface, according to recency of scene changes.

42. The computer program product of claim 39, wherein at least one video stream comprises a scene change, and wherein at least a portion of the video streams are ranked, and the associated video windows are arranged within the user interface, according to frequency of scene changes.

43. The computer program product of claim 39, wherein the video streams are ranked, and the associated video windows are arranged within the user interface, according to how many network terminals are displaying the respective video streams.

44. The computer program product of claim 39, wherein at least one video stream is promoted to a higher rank in response to the time of day thereby changing the location of the at least one respective video window within the user interface.

45. The computer program product of claim 39, wherein at least one video stream is promoted to a higher rank in response to the day of the week thereby changing the location of the at least one respective video window within the user interface.

46. The computer program product of claim 39, wherein at least one video stream is promoted to a higher rank in response to information contained within a user's calendar thereby changing the location of the at least one respective video window within the user interface.

47. The computer program product of claim 39, wherein displaying comprises:
    displaying at least a portion of the video windows in a grid format in the user interface.

48. The computer program product of claim 47, wherein a video window displayed near the top of the user interface is designated being associated with a video stream having a higher rank than a video window displayed near the bottom of the user interface.

49. The computer program product of claim 47, wherein a video window displayed near the left side of the user interface is designated as being associated with a video stream having a higher rank than a video window displayed near the right side of the user interface.

50. The computer program product of claim 39, wherein displaying comprises:
    displaying at least a portion of the video windows in a scrolling ticker format in the user interface.

51. The computer program product of claim 50, wherein the ticker format comprises a moving carousel of simultaneously-displayed video windows having a beginning position and an ending position, and wherein a video window displayed near the beginning position is designated as having a higher rank than a video window displayed near the ending position.

52. The computer program product of claim 39, wherein displaying comprises:
    visually emphasizing the video window associated with the video stream of highest rank within the user interface.

53. The computer program product of claim 52, wherein emphasizing comprises:
enlarging the video window associated with the video stream of highest rank as displayed on the user interface relative to the other video windows.

54. The computer program product of claim 39, wherein the network terminal comprises one of a cable network terminal and a direct satellite broadcast (DBS) network terminal.

55. The computer program product of claim 39, wherein the network terminal comprises an interactive television system.

56. The computer program product of claim 39, wherein at least one video stream comprises a broadcast television program.

57. The computer program product of claim 39, wherein at least one video stream comprises live video generated by a webcam.

58. A method for organizing video windows displaying streams received from multiple webcams linked by a network, the method comprising:
receiving a plurality of video streams at an interactive television system coupled to the network;
simultaneously displaying the video streams in respective video windows within a user interface provided by the interactive television system;
ranking at least a portion of the video streams according to a user-defined set of ranking criteria;
arranging the locations of at least a portion of the displayed video windows in the user interface in order of the ranking of the respective video streams as determined by the ranking criteria;
detecting a change of scene within a first video stream;
promoting the first video stream to a higher rank in response to said detecting of the scene change; and
re-arranging the locations of at least a portion of the displayed video windows in the user interface in order of the ranking of the respective video streams to reflect the promotion in rank of the first video stream.

59. A system for organizing video windows on a display screen, the video windows displaying respective video streams being received from multiple webcams linked by a network, the system comprising:
a stream reception component configured to receive a plurality of video streams at an interactive television system coupled to the network;
a stream display component configured to simultaneously display the video streams within respective video windows in a user interface provided by the interactive television system; and
a stream ranking component configured to rank at least a portion of the video streams according to a user-defined set of ranking criteria;
wherein the stream display component is further configured to visually emphasize within the user interface the video window associated with the video stream of highest rank.

60. A system for organizing the display of video windows on a television screen, the system comprising:
means for receiving a plurality of video streams at a set top box;
means for simultaneously displaying the video streams in respective video windows on the television in a user interface provided by the set top box;
means for ranking within the set top box at least a portion of the video streams according to a set of ranking criteria, wherein said ranking is to determine the relative locations of the video windows within the user interface; and
means for arranging the locations of at least a portion of the video windows within the user interface in order of the ranking of the respective video streams as determined by the ranking criteria.

61. A system for organizing the display of video windows depicting video streams received from multiple webcams linked by a network, the system comprising:
means for receiving a plurality of video streams at an interactive television system coupled to the network;
means for simultaneously displaying the video streams in respective video windows within a user interface provided by the interactive television system;
means for ranking within the interactive television system at least a portion of the video streams according to a user-defined set of ranking criteria, wherein said ranking is to determine the relative locations of the video windows within the user interface;
means for arranging the locations of at least a portion of the video windows in the user interface in order of the ranking of the respective video streams as determined by the ranking criteria;
means for detecting a change of scene within a first video stream;
means for promoting the first video stream to a higher rank in response to the scene change being detected; and
means for re-arranging the locations of at least a portion of the video windows in the user interface in order of rank to reflect the promotion in rank of the first video stream.

62. The method of claim 1, further comprising:
rearranging the locations of at least a portion of the video windows within the user interface to reflect a change in rank associated with a first video stream.

63. The system of claim 59, wherein the stream display component is further configured to visually emphasize the video window associated with the video stream of highest rank by enlarging it in the user interface relative to the other video windows.

64. The method of claim 1, wherein arranging comprises ordering the video windows within the user interface from left to right in order of decreasing rank of the respective video streams.

65. The method of claim 1, wherein arranging comprises ordering the video windows within the user interface from top to bottom in order of decreasing rank of the video streams.

* * * * *

UNITED STATES PATENT AND TRADEMARK OFFICE
CERTIFICATE OF CORRECTION

PATENT NO. : 7,272,657 B2
APPLICATION NO. : 09/918301
DATED : September 18, 2007
INVENTOR(S) : Allen et al.

It is certified that error appears in the above-identified patent and that said Letters Patent is hereby corrected as shown below:

Column 2, Line 61 reads, ". . . screen a carousel fashion . . ." which should read --. . . screen in a carousel fashion . . .--

Column 2, Line 66 reads, ". . . to focus every video stream . . ." which should read --. . . to focus on every video stream . . .--

Column 3, Line 28 reads, ". . . is shown system 100 . . ." which should read --. . . is shown a system 100 . . .--

Column 3, Line 31 reads, ". . . example, a broadband cable . . ." which should read --. . . example, as a broadband cable . . .--

Column 4, Line 7-8 reads, ". . . where video 110 streams . . ." which should read --. . . where video streams . . .--

Column 4, Line 33 reads, ". . . utilize a small 18-inch satellite . . ." which should read --. . . utilize a small 18-inch satellite . . .--

Column 6, Line 46 reads, ". . . an audio/video (AN) controller . . ." which should read --. . . an audio/video (A/V) controller . . .--

Column 6, Line 52 reads, ". . . the ANV controller . . ." which should read --. . . the A/V controller . . .--

Column 6, Line 60 reads, ". . . by the ANV controller . . ." which should read --. . . by the A/V controller . . .--

Column 8, Line 36 reads, ". . . example, a video streams 401 . . ." which should read --. . . example, video streams 401 . . .--

Column 8, Line 54 reads, ". . . depicting his home has . . ." which should read --. . . depicting his or her home has . . .--

UNITED STATES PATENT AND TRADEMARK OFFICE
CERTIFICATE OF CORRECTION

PATENT NO. : 7,272,657 B2
APPLICATION NO. : 09/918301
DATED : September 18, 2007
INVENTOR(S) : Allen et al.

It is certified that error appears in the above-identified patent and that said Letters Patent is hereby corrected as shown below:

Column 9, Line 28 reads, "FIGS. 5 and 6 illustrates one possible . . ." which should read --FIGS. 5 and 6 illustrate one possible . . .--

Column 14, Line 43 reads, ". . . is designated being associated with . . ." which should read --. . . is designated as being associated with . . .--

Signed and Sealed this

Fifth Day of August, 2008

JON W. DUDAS
*Director of the United States Patent and Trademark Office*